United States Patent [19]
Malow et al.

[11] Patent Number: 5,205,393
[45] Date of Patent: Apr. 27, 1993

[54] APPARATUS FOR TRANSFERRING SMALL GOODS OUT OF AND ONTO A CONVEYOR BELT

[75] Inventors: Siegmar Malow, Constance; Norbert Brucks, Berlin, both of Fed. Rep. of Germany

[73] Assignee: Licentia Patent-Verwaltungs-GmbH, Frankfurt, Fed. Rep. of Germany

[21] Appl. No.: 838,298

[22] PCT Filed: Jun. 26, 1991

[86] PCT No.: PCT/EP91/01198
§ 371 Date: Mar. 10, 1992
§ 102(e) Date: Mar. 10, 1992

[87] PCT Pub. No.: WO92/00906
PCT Pub. Date: Jan. 23, 1992

[30] Foreign Application Priority Data
Jul. 12, 1990 [DE] Fed. Rep. of Germany ....... 4022163

[51] Int. Cl.⁵ .............................................. B65G 37/00
[52] U.S. Cl. ................................... 198/369; 198/587; 198/592; 198/605
[58] Field of Search ............... 198/369, 435, 587, 604, 198/605, 592, 436, 575, 590, 626.1, 626.2, 626.5, 861.5, 861.6

[56] References Cited

U.S. PATENT DOCUMENTS

| 155,256 | 9/1874 | Randolph | 198/604 X |
| 2,891,467 | 6/1959 | Feilig | 198/605 X |
| 3,580,141 | 5/1971 | Richter | 198/435 X |
| 5,078,255 | 1/1992 | Haley | 198/369 X |

FOREIGN PATENT DOCUMENTS 268144 1/1969 Austria .

Primary Examiner—Joseph E. Valenza
Assistant Examiner—Cheryl L. Gastineau
Attorney, Agent, or Firm—Spencer, Frank & Schneider

[57] ABSTRACT

An apparatus for transferring small goods from a main conveyor belt onto a branch-off conveyor belt, the apparatus including a pivotal lateral guide perpendicular to the conveyor belt. The main conveyor belt as well as the beginning of the branch-off conveyor belt are provided with a pivotal module, with each module including two lateral conveyor belts that are perpendicular to the conveyor belt and the lateral conveyor belts of the pivotal module of the main conveyor belt have the same length while the lateral conveyor belts of the pivotal module of the branch-off conveyor belt have different lengths, with the difference in length corresponding to the offset of the lateral conveyor belts of the main conveyor belt in the pivoted-out state.

3 Claims, 1 Drawing Sheet

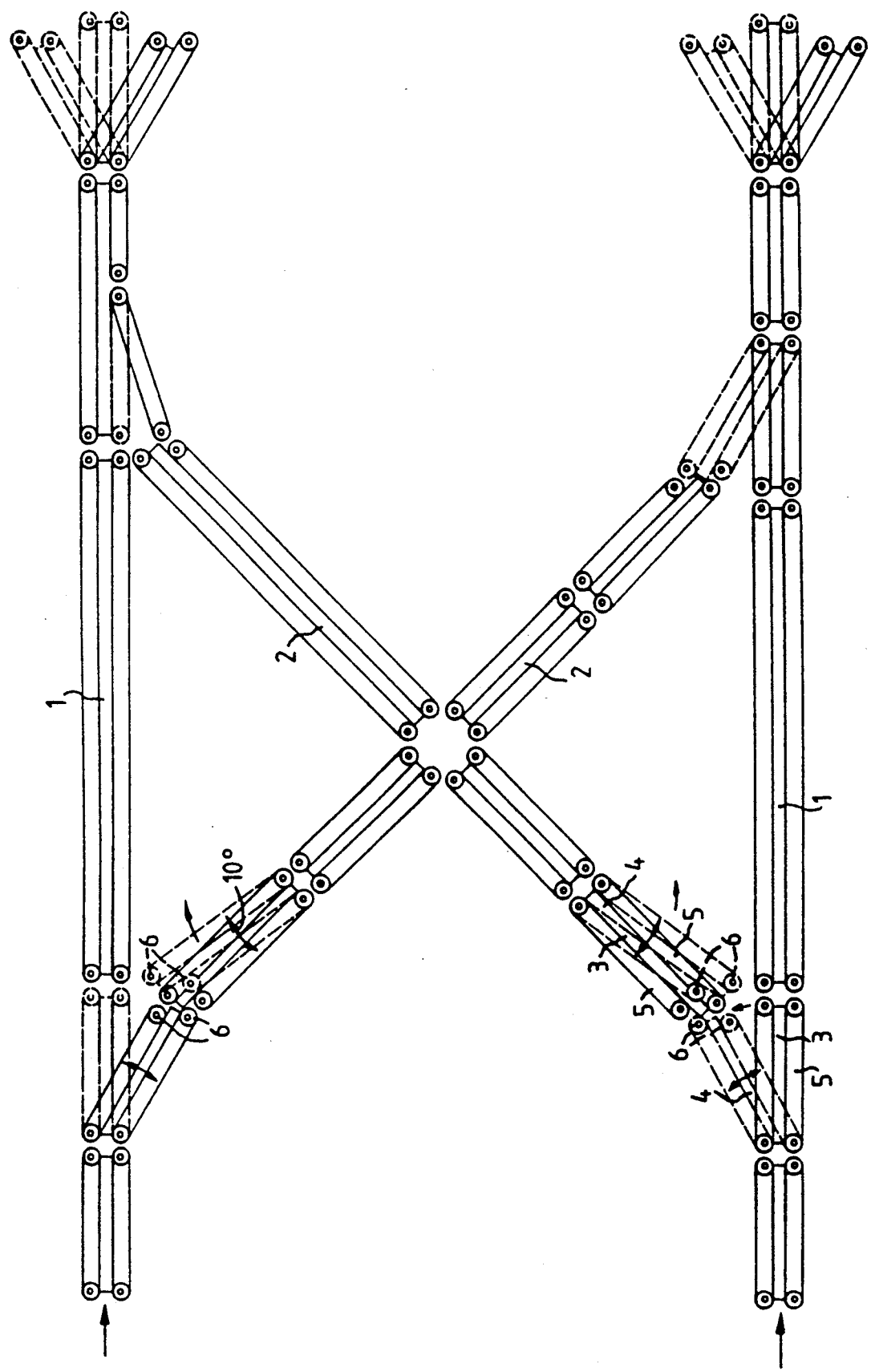

APPARATUS FOR TRANSFERRING SMALL GOODS OUT OF AND ONTO A CONVEYOR BELT

The invention relates to an apparatus for transferring small goods, particularly small packages, out of and onto a conveyor belt.

Such devices are known in which a pivotal lateral guide is disposed on the conveyor belt and, in order to transfer the goods to be transported, is pivoted in the direction of the branch-off conveyor belt. The lateral guides here conduct the goods onto the branch-off conveyor belt, with the pivotal lateral guide forming an acute angle with the previous transporting direction.

It is an object of the invention to provide a transfer device in which the connection between the main conveyor belt and the branch-off conveyor belt can be made without gaps.

According to the invention this is accomplished by the features of the following embodiment.

One embodiment of the invention will now be described with reference to the attached drawing.

In the drawing FIGURE, the main conveyor belts are marked 1 on which goods not shown in detail are transported in the direction of the arrow. The two main conveyor belts are connected with one another in a crosswise fashion by branch-off conveyor belts so that the goods can be transferred from one to the other conveyor belt or can be separated out.

According to the invention, pivotal modules 3 are disposed in the main conveyor belts 1 and at the beginnings of the branch-off conveyor belts 2; these modules can be pivoted toward one another away from the main conveyor belt 1. Modules 3 are each composed of a horizontal conveyor belt 4 forming the bottom of the module and lateral conveyor belts 5 which stand perpendicular on the bottom conveyor belt.

Module 3 which can be pivoted out of main conveyor belt 1 has lateral belts 5 of identical length. This is necessary in order to obtain a continuous straight conveying path for conveyor belt 1.

In the outwardly pivoted state, the same side length in the direction of branch-off conveyor belt 2 leads to an offset arrangement of the end points 6 of the lateral belts in the direction of the branch-off conveyor belt.

In order to avoid a gap in the lateral guidance of the goods to be transported, the invention provides that the branch-off conveyor belt is also equipped with a pivotal module 3 which has end points 6 on its lateral conveyor belts that are offset in a mirror image. The arrangement is further controlled in such a manner that, before the module of the main conveyor belt is pivoted outwardly, the module of the branch-off conveyor belt is pivoted in the direction of the main transporting path and, once the module of the main conveyor belt 1 has reached its pivoted-out end position, the module of the branch-off conveyor belt is pivoted so as to be flush with the module of the main conveyor belt.

The solution provided by the invention makes it possible to establish a continuous branch-off conveyor path without gaps and thus double crossovers as shown in the embodiment are also possible.

We claim:

1. An apparatus for transferring small goods from a main conveyor belt (1) to a branch-off conveyor belt (2), the apparatus including a pivotal lateral guide perpendicular to the conveyor belt, characterized in that a pivotal module (3) is provided in the main conveyor belt (1) as well as at the beginning of the branch-off conveyor belt (2), with each module (3) including two lateral conveyor belts (4) that are perpendicular to the conveyor belt and the lateral conveyor belts (4) of the pivotal module (3) of the main conveyor belt (1) have the same length and the lateral conveyor belts (4) of the pivotal module of the branch-off conveyor belt (2) have different lengths, with the difference in length corresponding to the offset of the lateral conveyor belts of the main conveyor belt when pivoted out.

2. An apparatus according to claim 1, characterized in that a control is provided which, before the module (3) of the main conveyor belt (1) is pivoted out, pivots the module (3) of the branch-off conveyor belt (2) in the direction of the main conveyor belt and, after the module (3) of the main conveyor belt 91) has been pivoted out, pivots the module (3) of the branch-off conveyor belt back so as to be flush with the module (3) of the main conveyor belt.

3. An apparatus according to claim 2, characterized in that the pivot angle of the module of the branch-off conveyor belt in the direction of the main conveyor belt is approximately 10°.

* * * * *